Dec. 1, 1931. G. C. THOMAS, JR 1,833,956
CABLE CONNECTER
Original Filed Jan. 30, 1929
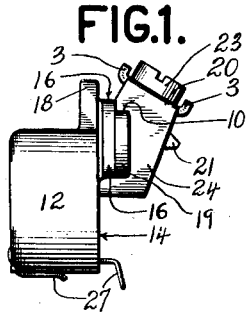
FIG.1.
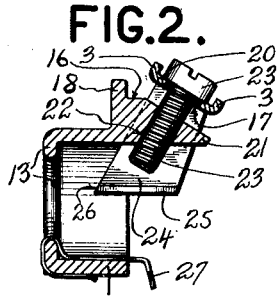
FIG.2.
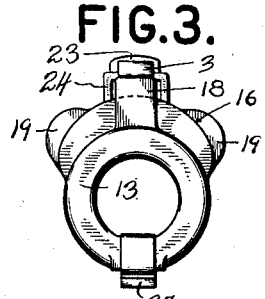
FIG.3.
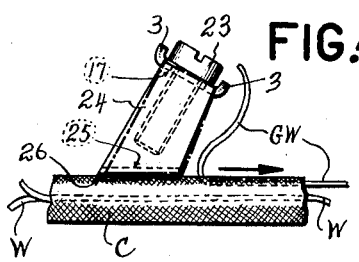
FIG.4.
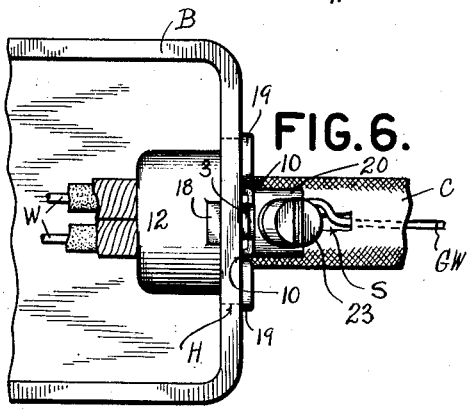
FIG.5.
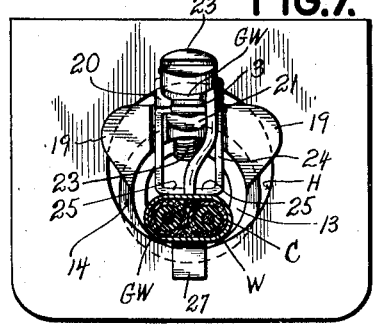
FIG.6.
FIG.7.
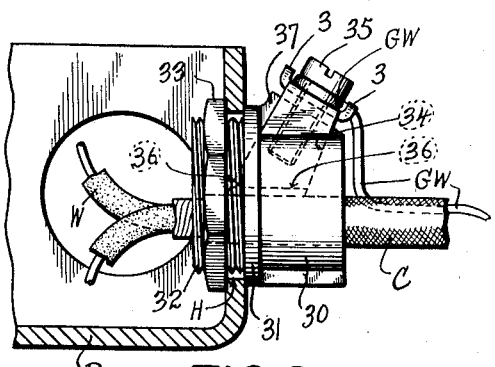
FIG.8.
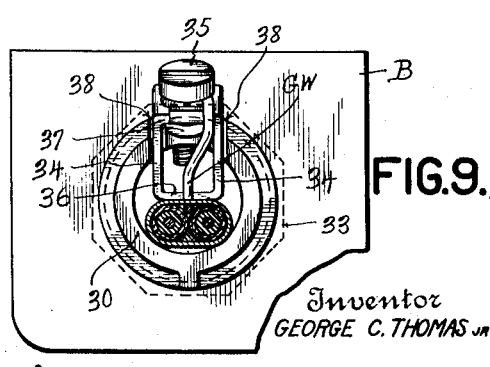
FIG.9.
Inventor
GEORGE C. THOMAS JR
By his Attorneys

Patented Dec. 1, 1931

1,833,956

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed January 30, 1929. Serial No. 336,052. REISSUED

This invention relates to outlet-box fittings such as connecters for use with electrical outlet-box assemblies and the like, and more particularly relates to cable connecters for securing cable to boxes used in connection with house and building electrical wiring jobs and installations.

An important object of this invention is to produce a combination cable connecter and ground-wire connecter in one and the same device.

Another object is to produce a novel cable connecter simple in structure and easy to use and which will positively anchor a cable to an outlet box as well as simultaneously anchor itself to the box by actuation of a single operating means; and a further object is to produce a connecter provided with ground wire connecting means by which a special ground wire contained in the cable may be attached to the connecter and hence to the outlet box to establish a positive electrical ground connection to render safe the wiring system.

A further object of the invention is to produce improvements in cable clamping means forming a part of the connecter, the clamping means being actuated by an operating means to fix the cable in the box; and in one form of the invention, the reaction force produced by the operating means simultaneously anchors the connecter in the box knock-out. In a modified form of the invention, the operating means merely functions to actuate the cable clamp since there is provided a separate and independent anchorage means to fix the connecter in the box. In both forms I provide a ground-wire connecting screw to electrically connect with a cable ground wire.

Having the foregoing objects and others in view, the invention relates to improvements in construction and use as shown in the examples of the invention portrayed in the accompanying drawings, wherein:

Figure 1 shows a side elevation, Figure 2 a longitudinal section, and Figure 3 an inside end elevation of the cable connecter.

Figure 4 shows, respectively, a side and end elevation of a novel cable clamp loosely carried on screw operating means and engaging a fiber armored cable. These two views are in effect diagrammatic to show the application of the two-legged U-shaped or yoke-like cable clamp to the cable. Particularly the side view shows in dotted lines the tilted back position of the lower end of the clamp and illustrates how its front end or edge digs into the cable to more firmly grip the cable in event a strain or pull is exerted on the cable in the direction of the arrow tending to jerk the cable from or loosen it in the box. A ground wire GW contained in the cable C is shown electrically connected with the cable connecter.

Figure 5 shows a box assembly view in longitudinal section with the box, the cable connecter and the cable in finally anchored position, and with the ground wire GW attached to the connecter.

Figure 6 is a plan view of the box assembly with the combination ground wire and cable connecter and cable anchored in place; and Figure 7 is an outside end elevation thereof.

Figures 8 and 9 show a modified form of the invention. Figure 8 being a longitudinal section of the box assembly and Figure 9 being an outside end elevation thereof. This modified form of combination ground wire and cable connecter differs from the main form only in the box-anchorage means to fix the connecter in the box, since in this modified form I employ an ordinary lock nut to anchor the connecter in the box, whereas in the first form of the invention I employ a single operating means such as a clamp screw to perform all functions of anchoring the connecter in the box, securing the cable in the box, and connecting a ground wire to the box.

In house wiring installations, a box B is anchored to the building in the usual way and a cable C containing electrical wiring W is introduced through the box knock-out or hole H formed in the box. Electrical wire connections are made with the current feed wires W in the box for supplying current to lighting fixtures, electrical appliances and the like and the present invention relates to improved connecter means for fastening the cable C to the box B, and more particularly relates to means for electrically grounding the box B so as to render the wiring system safe. A single screw is made to perform the several purposes of anchoring the connecter in a box, attaching the cable to the box, and securing a ground wire to the box. My improved connecter is especially adapted for use with cable C, whether fiber or metal armored, which includes a special third wire GW adapted for grounding purposes.

The connecter consists of a casting or frame part made in any suitable shape such as a connecter member 12 which is here shown as a sleeve and on which the movable parts are mounted. The sleeve 12 may assume various forms of construction which is apparent from an inspection of the two examples of the invention. One type of connecter member is shown at 12 in Figures 1 through 7, while another type of connecter member is shown at 30 in Figures 8 and 9. The connecter member may be made with a bushing 13 which acts as a stop against which rests the inner end of the cable C as shown in Figure 5. The other end of the connecter member is cut away at 14 thereby leaving an overhanging extended portion which projects beyond the edge 14 to produce a connecter member having a short and long portion. The cut away end or face 14 of the member affords the flat abutment end or edge 14 which rests against the box wall when the connecter is installed. In this instance the connecter end portion 14 rests against the inside box wall surface.

The casting 12 includes a box hole edge seat 16 raised on the member 12 and which may to advantage be formed on a radius substantially equal to the radius of the box hole H so as to fit thereinto. This arcuate box hole edge seat 16 is eccentric to the axis of the cable C and hence is eccentric to the axis of the sleeve 12. When the connecter is in place in box hole H, the seat 16 displaces the connecter 12 off center of the axis of the box hole H. This arrangement seats the cable C against the exposed portion of the box hole edge which is left uncovered by the cut-away end formation 14 of the connecter when it is mounted in the box hole.

The connecter sleeve 12 also includes box abutments or box anchorage means comprising spaced ears 18 and 19. There are three ears shown and they are adapted to anchor the connecter in the box hole against longitudinal displacement. Two of the anchorage ears, say 19, may be formed in circumferential alignment while the other ear 18 is spaced from the ears 19 a distance about equal to the thickness of the box wall B and in this way the box wall rests on the seat 16 between the ear 18 and ears 19. Hence the abutment or anchorage means 18—19 are disposed on the outside and inside of the box wall and anchor the connecter against longitudinal displacement so long as the connecter seat 16 engages the box hole edge.

The overhanging portion of the connecter carries the eccentric box hole edge seat 16 and abutment ears 18 and 19 above or opposite the cut-away end edge 14 as shown. Furthermore the elongated or overhanging portion includes a screw support lip 21 in which a threaded screw hole 22 is preferably made at an angle to the axis of the connecter member 12 and the box hole H. Operating means such as a screw 23 is mounted in the threaded hole 22 and the axis of the screw is directed at an angle to the box-wall B whereby the force delivered by the screw is in a direction toward the exposed box hole edge portion which is opposite the arcuate seat 16 and screw 23.

The overhanging screw carrying lip 21 is disposed between the outside box ears 19 and preferably has parallel sides. The parallel sides of the lip 21 in effect define slots 10 between the ears 19 and the lip 21. The slots 10 are directed along a plane parallel to the axis of the screw 23 for slidable and guided reception of an improved cable clamp 24 made substantially U-shaped and includes parallel clamp legs 24 which slidably straddles the lip 21. The parallel sides of the lip 21 forms a guide on which the cable clamp 24 slides up and down in relation to the cable.

A free or unthreaded screw hole 17 is made in the top or head of the clamp for the free reception of the screw 23 which slidably retains the clamp 24 in place. The cable clamp 24 has its lower ends formed at an angle to the axis of the screw and turned inwardly to form flat pressure feet as indicated at 25 and the clamp legs are pointed at 26 on their front edges, i. e., the forward edge 26 is made in the form of a beveled or sharpened edge. The flat ends 25 of the cable clamp are disposed in separated relation but stand parallel to the cable C so as to bear against the cable when the clamp is tightened in final fixed position. The cable clamp 24 is loose on the screw 23, the screw hole 17 being large and loose, so as to adjust itself and tilt to dig the forward edge 26 into the cable should an outward pulling force be exerted thereon as illustrated in Figure 4.

The clamp 24 being placed and guided astride the screw carrying lip 21, moves up and down in guided relation in the grooves or slots 10 formed between each ear 19 and the lip 21 when the slots or grooves 10 are used. The threaded shank of the screw 23 is preferably shorter than the plate-like clamp legs 24 and this relation of the screw and the clamp prevents the screw end from engaging the cable and crushing it. In other words, the pressure or cable clamp feet 25 of the cable clamp first reach and grip the cable C between said feet 25 and the exposed box hole edge H and accomplishes this purpose before the screw has reached the cable. The screw is preferably just long enough to be screwed well into or substantially through the overhanging lip 21 at the time the cable clamp 24 has reached firmly seated engagement against the cable C.

The parallel flat clamp plates or legs 24 may be disposed in substantially parallel planes and which planes are also about parallel to the cable axis and the clamp legs are disposed at an angle to the cable axis so that the head 20 of the cable clamp is mounted outside the connecter and is engageable by the screw operating means 23 to move the clamp down into engagement with the cable. The cable is gripped by the two pressure feet 25 along parallel lines on each side of the axis of the cable. The width and breadth and hence the spread of the feet 25 are sufficient to bridge over the convolutions of spirally wound metal-armored cable and therefore a positive grip is secured on the cable whether smooth fiber covered or convoluted. Furthermore, the plates 24 and pressure feet 25 are stamped out of relatively thin stock and their front edges 26 present sharp portions which burr onto the cable to grip and hold.

The pressure developed by the screw 23 and imparted to the cable clamp 24 very positively seats the cable C against the exposed box hole edge H and the reaction from the force produced by the screw causes the connecter seat 16 to be forced against the box hole edge with the ears 18 and 19 bearing against the inside and outside box wall surface to thereby anchor the cable connecter 12 against any possible longitudinal displacement. It is the disposition of the box-anchorage means 18—19 which anchors the connecter in the box at the same time the operating means 23 functions to grip the cable. The cable clamp front edges 26 burr, squeeze and press into the cable especially so if there is any tendency for the cable to be pulled from the box because a jerk or force on the cable in the direction of the arrow Figure 4 tilts or levers the clamp 24 rearwardly about the screw as a pivot thereby more deeply embedding the clamp edges 26 into the cable. In wiring and building construction, it frequently happens that a cable is subjected to a jerking force by reason of a workman accidently stepping on or dropping material on a cable, but this connecter is found to tighten up when that happens.

Another feature to be observed is that the clamp biting edges 26 and feet 25 overlie the cut-away edge 14 and hence overlie the exposed box hole edge portion left uncovered thereby. In other words the clamp feet extend thru the box hole H from outside to inside the box and this is accomplished by the angular setting of the yoke-clamp 24 in respect to the cable axis which places the head 20 of the clamp yoke outside the box but disposes the pressure feet 25 inside of the box.

It is noteworthy that the clamp edge 26 and pressure feet 25 which are opposite the headed end 20 of the clamp, afford two spaced parallel cable gripping portions which bear on the cable to each side of the center thereof. In other words, the two spaced gripping foot portions 25—26 bear on each side of the axis of the cable as distinguished from bearing directly on the top or center of the cable which is common in the art as far as metal-armored spirally wrapped cable is concerned and which is more likely to crush the metal-armored cable when that is used than when bearing or gripping all the way across the cable as characteristic of this invention. By delivering the gripping force to the side of and fully across the cable very nearly tangent to the circle defining the cable, it follows that there exists less danger of crushing the cable than when delivering the force centrally thereon; and by delivering the clamping force to two sides of the cable in a tangential manner and bodily across the cable it follows that one force opposes the other and there exists no tendency to rotate the cable because the force of one gripping plate 24 opposes that of the other. These features afford advantages in the several ways explained.

An important feature of this invention resides in ground wire connecting means of a simple and positively working character. In some special types of electrical cable C which contains the usual circuit wires W, there is also provided a special ground wire GW to safeguard against short circuits and to ground or carry off stray potential. The cable C shown herein is what is known as fiber-armored cable and contains a third wire GW which is usually a bare wire and can be torn out through the cable by forming a slit S in the cable as shown in Figure 6 whereupon the wire GW is curled around and under the head of the screw 23. The other end of the ground wire GW is suitably connected to any grounded object.

In order to afford a suitable ground wire seat on the connecter to receive the torn-out ground wire end, the head 20 of the cable clamp 24 is struck up to form wire retaining ears 3, about two of which being oppositely disposed in relation to the screw 23, are adequate to hold the ground wire under the screw head as it is tightened. The screw 23 serves the triple function of working the clamp 24 to grip the cable, of anchoring the connecter in the box B, and of electrically connecting the ground wire to the box. This box fitting is simple in construction and comprises few parts considering the several purposes fulfilled thereby.

The U-shaped cable clamp therefore has a headed end 20 made with struck-up ears 3 down into and between which fits the screw head 23. The ears 3 positively hold the curl of wire formed on the ground wire GW and prevents its displacement when the screw is tightened down on the wire curl or loop placed under the screw head. The other end of the U-shaped clamp 24 may or may not be formed with pressure jaws 25, depending somewhat on the character of cable used and kind of work to be performed.

The connecter is mounted in the box by a tilting action and by angularly introducing the connecter 12 through the box hole until the inner ear 18 has been inserted, whereupon the connecter is straightened up with the abutment end edge 14 resting against the box wall surface and with the connecter seat 16 against the box hole edge. The mechanic may now hold the connecter with one hand while he introduces the cable C with the other, and thereafter tightens up the screw 23 and thus presses the clamp 24—25 against the cable to complete the box assembly.

The foregoing description discloses a cable connecter of a type wherein the box hole edge H is partly exposed by the connecter when placed in the box hole. This type of connecter drops out of place unless held by one's hand until the cable C is inserted. To obviate this difficulty, a connecter support spring 27 may be attached to the shorter portion of the connecter member and the spring 27 overhangs the end edge 14. Spring 27 rests against the exposed box hole edge portion and may to advantage hook around the box wall as shown in Figure 5. This arrangement holds the connecter 12 in place without the aid of the mechanic's hand. The spring 27 yields or bends upwardly so the connecter may be tilted and pressed downwardly until the ear 18 slips through the box hole, whereupon the spring 27 reacts and snaps the connecter seat 16 up against the box hole edge and holds the connecter in place thereby freeing one's hand for other work. The advantage of the spring 27 is obvious and it is mentioned but not claimed herein.

In both forms of the invention, the head 20 of the cable clamp is advantageously engaged by the head of the screw 23 which drives the parallel clamp plates 24 and their jaw plates and jaw-like feet 25 against the cable surface, and the proximate surfaces of the screw head and the clamp head 20 are parallel and evenly engage each other. Although the loose-fitting screw hole 17 allows the clamp jaws 25 to wobble or tilt in relation to the screw, the flat screw head engages the clamp head 20 and straightens up the clamp plates 24 causing them to force their jaw-like pressure members 25 against the surface of the cable, bridging over the convolutions of the cable when spiral cable is used due to the reach or length of the jaw-like portions 25.

A modified form of the invention is shown in Figures 8 and 9 and differs in structure from that heretofore described in that the box anchorage means is altered and a nut and screw anchorage means 32—33 is here used instead of abutments 18—19 on the exposed box hole edge type of connecter heretofore described.

The modified form of connecter comprises a sleeve 30 having a shoulder 31 and a screw threaded neck 32 with a lock nut 33 which anchors the connecter 30 in the box B. In all other respects, a cable clamp 34 used on the connecter 30 is similar or the same as that heretofore described and is actuated by a screw 35 so as to drive the inner clamping jaw ends 36 into the cable. The U-shaped or yoke clamp 34 straddles a lip 37 and slides in guide-ways or slots 38 formed in the sleeve at each edge of the lip 37. The clamp 34 is free and in effect tiltable on the screw 35 and any force exerted on the cable tending to dislodge it from the box causes the front edge 36 of the two clamp legs 34 to dig into the cable armor and by a leverage action the front edges 36 increase their digging-in effort and thereby positively secures the cable in the box.

In this second form of construction just described, the screw 35 performs two purposes only, that of actuating the cable clamp and that of electrically connecting the ground wire GW to the cable connecter, since the box anchorage means 32—33 is quite independent of the screw 35. However, in the first form of construction, it is clear that the box anchorage means 18—19 is dependent on the screw 23 to render effective said anchorage means to fix the connecter in the outlet box.

Both forms of the invention presented herewith fill a long felt want for a simple one-screw combined cable and ground wire connecter which will fulfill all requirements, yet have a single operating means.

What I claim is:

1. In a connecter, a member adapted to fit in a box hole and means to anchor it therein, a yoke-shaped clamp including a head and parallel legs slidably mounted on the member, a screw passed freely through the head and threaded through the member, and at least one ground wire ear formed on the head and directed upwardly therefrom in a direction opposite to that of the legs.

2. In a connecter, a member and means to anchor it in a box, a clamp including spaced parallel plates formed at right angles on a head and ears struck-up from the head between the plates and projecting in an opposite direction therefrom, a screw loosely mounted through the head between and parallel to the plates and between the ears and said screw being threaded through the member toward a cable received into the box, and said plates being slidably mounted in openings formed in the member and having ends opposite the head which grips the cable.

3. A connecter comprising a member adapted to fit into a box hole and means to anchor it therein, a cable clamp comprising parallel plates to engage a cable received into the box, a pressure foot turned inwardly on the end of each plate and bearing on the cable, the other ends of the plates being integrally formed on a head which is disposed at right angles thereto and the head being disposed in spaced relation from the pressure feet, a lip formed on the member and mounted within the cable clamp between the head and pressure feet, and a screw loosely mounted through the head and pointed toward the pressure feet and threaded through the lip.

In testimony whereof I affix my signature.

GEORGE C. THOMAS, Jr.